(12) United States Patent
Hildebrand et al.

(10) Patent No.: US 9,021,287 B2
(45) Date of Patent: Apr. 28, 2015

(54) CIRCUIT ARRANGEMENT AND METHOD FOR LOW POWER MODE MANAGEMENT WITH DELAYABLE REQUEST

(75) Inventors: Uwe Hildebrand, Fuerth (DE);
Matthias Esswein, Henfenfeld (DE);
Thomas Nothdurft, Zirndorf (DE);
Stefan Macher, Fuerth (DE); Uwe Kliemann, Rednitzhembach (DE)

(73) Assignee: Intel Mobile Communications GmbH, Neubiberg (DE)

( * ) Notice: Subject to any disclaimer, the term of this patent is extended or adjusted under 35 U.S.C. 154(b) by 295 days.

(21) Appl. No.: 13/602,394

(22) Filed: Sep. 4, 2012

(65) Prior Publication Data

US 2014/0068303 A1    Mar. 6, 2014

(51) Int. Cl.
*G06F 1/00* (2006.01)
*G06F 1/32* (2006.01)
*H04W 52/02* (2009.01)

(52) U.S. Cl.
CPC ...... *H04W 52/0254* (2013.01); *H04W 52/0216* (2013.01); *H04W 52/0258* (2013.01)

(58) Field of Classification Search
CPC ..................................................... G06F 1/3203
USPC .......................................................... 713/323
See application file for complete search history.

(56) References Cited

U.S. PATENT DOCUMENTS

| | | | | |
|---|---|---|---|---|
| 5,713,029 A * | 1/1998 | Kaiser et al. | | 713/322 |
| 6,326,825 B1 * | 12/2001 | Walley | | 327/160 |
| 6,892,315 B1 * | 5/2005 | Williams | | 713/502 |
| 7,072,697 B2 * | 7/2006 | Lappetelainen et al. | | 455/574 |
| 8,019,316 B2 * | 9/2011 | Huston et al. | | 455/343.1 |
| 8,255,011 B2 * | 8/2012 | Westcott et al. | | 455/574 |
| 8,448,002 B2 * | 5/2013 | Bulusu et al. | | 713/323 |

* cited by examiner

*Primary Examiner* — Suresh Suryawanshi

(57) ABSTRACT

For example, a circuit arrangement is provided comprising a clock generator configured to generate a clock signal, a circuit having a low power mode, and a controller, configured to receive, when the circuit is in the low power mode, a request specifying that the circuit should return from the low power mode and trigger the circuit to return from the low power mode when the number of clock cycles of the clock signal since the reception of the request has reached a threshold value.

22 Claims, 6 Drawing Sheets

CIRCUIT ARRANGEMENT AND METHOD FOR LOW POWER MODE MANAGEMENT WITH DELAYABLE REQUEST

TECHNICAL FIELD

The present disclosure relates to circuit arrangements and methods for low power mode management.

BACKGROUND

In a mobile phone and other battery-powered embedded systems current consumption is typically an important issue. Therefore a low-power state such as a sleep state may be applied as much as possible in order to reduce current consumption in such as device. Wake-up from such a sleep state is an important parameter for power consumption. A wake-up event can originate from various sources, like user interaction, but also scheduled activities. Efficient approaches for the wake-up from a sleep mode are desirable.

SUMMARY

For example, a circuit arrangement is provided including a clock generator configured to generate a clock signal, a circuit having a low power mode, and a controller, configured to receive, when the circuit is in the low power mode, a request specifying that the circuit should return from the low power mode and trigger the circuit to return from the low power mode when the number of clock cycles of the clock signal since the reception of the request has reached a threshold value.

As another example, a method for low power mode management according to the circuit arrangement described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
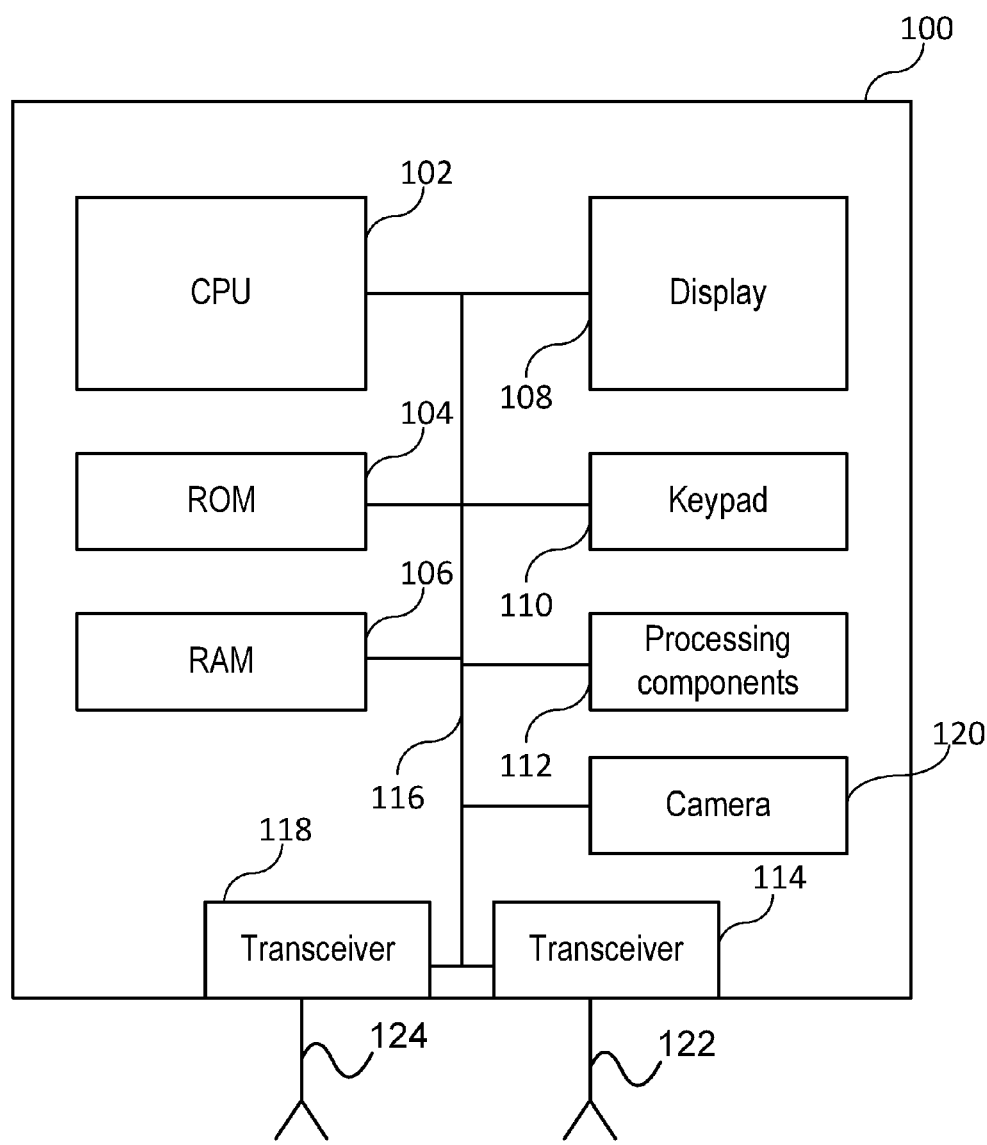
FIG. 1 shows a communication device.

FIG. 1 shows a communication device 100.

The communication device 100 may include a processor 102, such as e.g. a microprocessor (e.g. a central processing unit (CPU)) or any other type of programmable logic device (which may for example act as controller). Furthermore, the communication device 100 may include a first memory 104, e.g. a read only memory (ROM) 104 and/or a second memory 106, e.g. a random access memory (RAM) 106. Moreover, the communication device 100 may include a display 108 such as e.g. a touch sensitive display, e.g. a liquid crystal display (LCD) display or a light emitting diode (LED) display, or an organic light emitting diode (OLED) display. However, any other type of display may be provided as the display 108. The communication device 100 may in addition include any other suitable output device (not shown) such as e.g. a loudspeaker or a vibration actuator. The communication device 100 may include one or more input devices such as keypad 110 including a plurality of keys. The communication device 100 may in addition include any other suitable input device (not shown) such as e.g. a microphone, e.g. for speech control of the communication device 100. In case the display 108 is implemented as a touch sensitive display 108, the keypad 110 may be implemented by the touch sensitive display 108. Moreover, optionally, the communication device 100 may include further processing components 112 such as one or more controllers (e.g. display or memory controllers) or a co-processor to take processing load from the processor 102. Furthermore, the communication device 100 may include a plurality of transceivers 114, 118 which may be part of a communication circuit and which may allow the communication device 100 to use various radio access technologies for communicating. The above described components may be coupled with each other via one or more lines, e.g. implemented as a bus 116. The first memory 104 and/or the second memory 106 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 102 (and optionally the further processing components 112) may be stored in the first memory 104. Data (e.g. the messages received or to be transmitted via the first transceiver 114) to be processed by the processor 102 (and optionally the further processing components 112) may be stored in the second memory 106.

One or more of the transceivers 114, 118 may for example be configured such that it implements a Uu interface in accordance with LTE or an air interface in accordance with another other radio communication technology.

Each transceiver 114, 118 is coupled with one or more respective antennas 122, 124 used by the transceiver 114, 118 to transmit and receive radio signals. The communication device 100 and one or more of the transceivers 114, 118 may also be configured to provide MIMO radio transmission.

For example, one of the transceivers 114, 118 supports a cellular wide area radio access technology while the other transceiver 114, 118 supports a different radio communication technology e.g. a Wireless Local Area Network (WLAN) technology, e.g. a Personal Area Network (PAN) technology or any other desired wireless communication technology. Thus, the communication device 100 may support usage of a plurality of different radio access technologies simultaneously.

Moreover, the communication device 100 may include a still image and/or video camera 120, configured to provide a video conference via the communication device 100.

Furthermore, the communication device 100 may include a Subscriber Identity Module (SIM), e.g. a UMTS Subscriber Identity Module (USIM) identifying a user and subscriber of the communication device 100 e.g. for usage of a cellular wide area communication network.

The processor 102 may include audio processing circuits such as e.g. an audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

The communication device 100 is for example a mobile communication terminal such as a mobile phone. In a mobile phone and other battery-powered embedded systems current consumption is typically an important issue. Therefore a low-power state such as a sleep state may be applied as much as possible in order to reduce current consumption in such as device. Also wake-up from such a sleep state is an important parameter for power consumption. A wake-up event can originate from various sources, like user interaction, but also scheduled activities. Depending on the wake-up source and the related required functionality, a delay of the actual wake-up may be acceptable or not.

Wake-up events may be synchronized in order to minimize system wake-ups and consequently to reduce current consumption.

Consolidation of wake-up events may be done in software, which may be executed on a dedicated system controller CPU, e.g. the CPU 102. For this, however, the system controller subsystem, possibly including the CPU, needs to be awake (powered up) for performing this task, i.e. cannot go to sleep mode itself. This accordingly contributes to system's power consumption.

Wake-up events may be consolidated (i.e. for example synchronized) such that not every wake-up event immediately results in the wake-up of the system from low power mode. This allows reducing the occurrences of system-level wake-up. Further, it may be avoided that the main CPU (such as CPU 102) is involved from the beginning in the wake-up processing. Thus, power consumption may be decreased.

An example for a circuit arrangement (e.g. a communication device or included in a communication device such as a mobile phone) that may be provided is described in the following with reference to FIG. 2.

Figure 2:
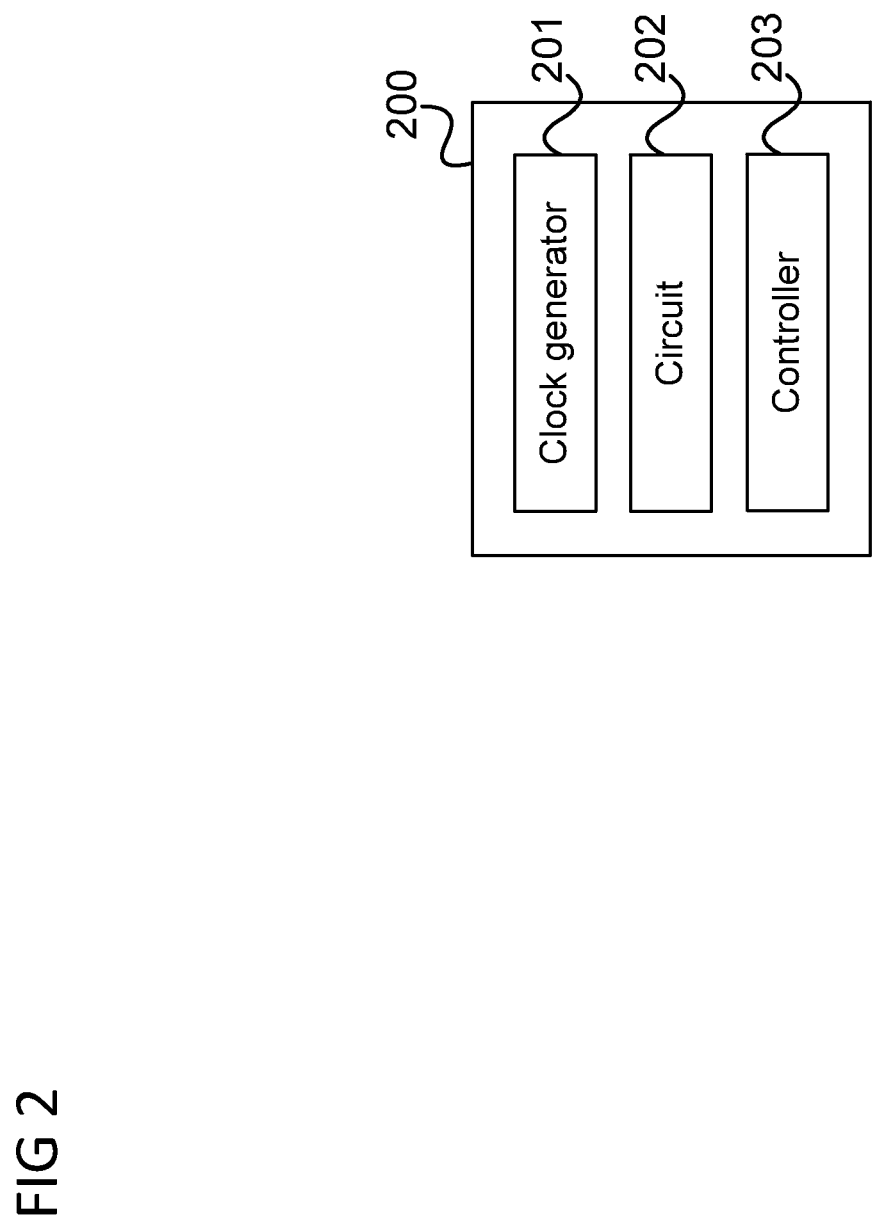
FIG. 2 shows a circuit arrangement.

FIG. 2 shows a circuit arrangement 200.

The circuit arrangement 200 includes a clock generator 201 configured to generate a clock signal; and a circuit 202 having a low power mode.

The circuit arrangement 200 further includes a controller 203, configured to receive, when the circuit is in the low power mode, a request specifying that the circuit should return from the low power mode; and to trigger the circuit to return from the low power mode when the number of clock cycles of the clock signal since the reception of the request has reached a threshold value.

In other words, a circuit (e.g. a system or subsystem) is not returned from low power mode immediately, but a delay (in terms of clock cycles) is introduced that allows for example one or more further requests to return from low power mode (e.g. further wake-up events) to income in addition to the request that has been received such that in effect, the circuit is returned from low power mode when a plurality of requests to return from low power mode have been received, such that the requests are synchronized (or consolidated).

A request may for example only be delayed if it corresponds to a delayable wake-up event. For example, soft wake-up events are defined which can tolerate a certain delay, and thus allow synchronization of multiple wake-up events. By such a synchronization of wake-up events the overall number of system wake-up occurrences (i.e. wake-up occurrences of the circuit 202) can be reduced.

A "circuit" (which may also be used to implement the components of the circuit arrangement such as the controller) may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The controller is for example configured to check, upon reception of the request, whether the request is delayable and is configured to trigger the circuit to return from the low power mode when the number of clock cycles of the clock signal since the reception of the request has reached the threshold value if it has been detected that the request is delayable.

The controller may be configured to trigger the circuit to return from the low power mode when the number of clock cycles of the clock signal since the reception of the request has reached the threshold value or when the controller receives a further request specifying that the circuit should return from the low power mode that is undelayable.

The controller may be configured to check, upon reception of the further request, whether the further request is undelayable.

In one example, the circuit has a high power mode and a low power mode and the request specifies that the circuit should switch to the high power mode.

The low power mode is for example a sleep mode and the request is for example a wake-up request.

The circuit is for example a processor.

The circuit arrangement may for example further include, in addition to the circuit, a hardware component implementing the controller.

The controller is for example configured to be in a high power mode when the circuit is in the low power mode. Since the controller may be part of the standby logic and may be operational permanently (as long as the device including the circuit arrangement is switched on), the high power mode of the controller may be the normal operation mode of the controller and the controller may have no low power mode.

For example, the low power mode is a sleep mode and the controller is configured to be awake when the circuit is in sleep mode.

The circuit arrangement may further include a plurality of further circuits having a low power mode, wherein the circuit is a circuit configured to determine which further circuits of the plurality of further circuits should be triggered to return from the low power mode in response to the request.

The request is for example associated with a function to be provided by the circuit arrangement and the circuit is for example configured to determine which further circuits of the plurality of further circuits should be triggered to return from the low power mode in response to the request.

For example, the circuit arrangement is a communication device (or is part of a communication device). The circuit arrangement may also be part of an embedded system.

The circuit arrangement is for example a mobile terminal (or is part of a mobile terminal).

The threshold value for example depends on a type of the request (e.g. whether it is delayable or undelayable).

The controller may further be configured to determine the threshold value for the request based on information about the request.

The request is for example associated with a function to be provided by the circuit arrangement and wherein the threshold value depends on the function.

For example, the request is associated with a function to be provided by the circuit arrangement and the controller is configured to determine the threshold value for the request depending on the function.

The controller for example includes a delay element configured to delay the request by a number of clock cycles depending on the threshold value.

The controller may include a delay element configured to delay the request by a number of clock cycles equal to the threshold value. It should be noted that there may be a further delay until the circuit wakes up, for example due to a processing for the triggering of the wake-up of the circuit. For example, after the threshold has been reached, the return of the circuit from the low power mode is triggered but the triggering (which may involve the generating of a signal or message requesting the circuit to return from low power mode and the signaling or transmitting of the message) may require additional clock cycles.

For example, the controller is further configured to start a timer in response to the reception of the request, wherein the timer is clocked by the clock signal, and to trigger the circuit to return from the low power mode when the timer has reached the threshold value.

The controller may further include a signaling circuit and may be configured to trigger the circuit to return from the low power mode by controlling the signaling circuit to supply a wake-up signal to the circuit.

Figure 3:
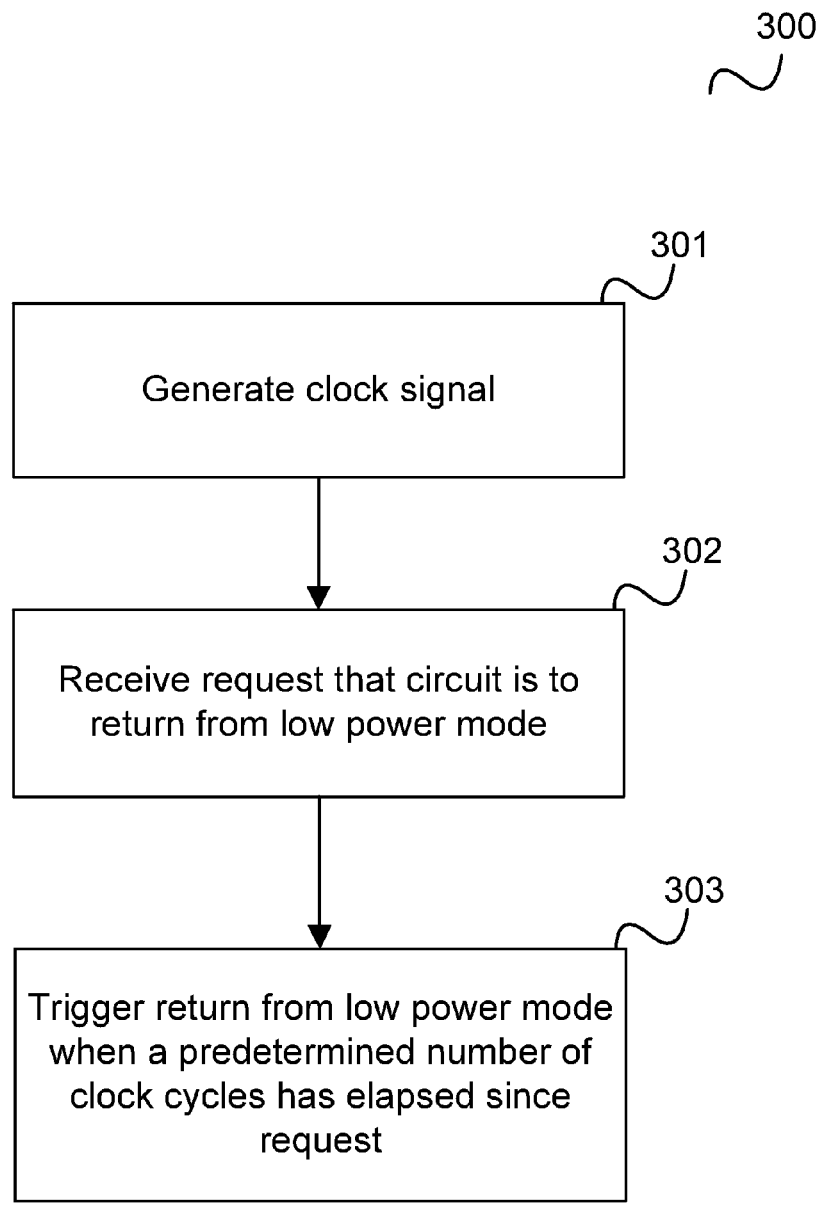
FIG. 3 shows a flow diagram.

The circuit arrangement 200 for example carries out a method as illustrated in FIG. 3.

FIG. 3 shows a flow diagram 300.

The flow diagram 300 illustrates a method for low power mode management, e.g. for wake-up management from a sleep mode.

In 301, a clock signal is generated by a clock generator, e.g. by a circuit arrangement as included in an electronic device.

In 302, a receiver, e.g. of the circuit arrangement, receives, when a circuit (e.g. of the circuit arrangement) is in the low power mode, a request specifying that the circuit should return from the low power mode.

In 303, the circuit is triggered, e.g. by a controller of the circuit arrangement, to return from the low power mode when the number of clock cycles of the clock signal since the reception of the request has reached a threshold value.

It should be noted that aspects described in context of the circuit arrangement 200 are analogously valid for the method illustrated in FIG. 3 and vice versa.

An example for a circuit arrangement is described in the following with more detail in FIG. 4.

Figure 4:
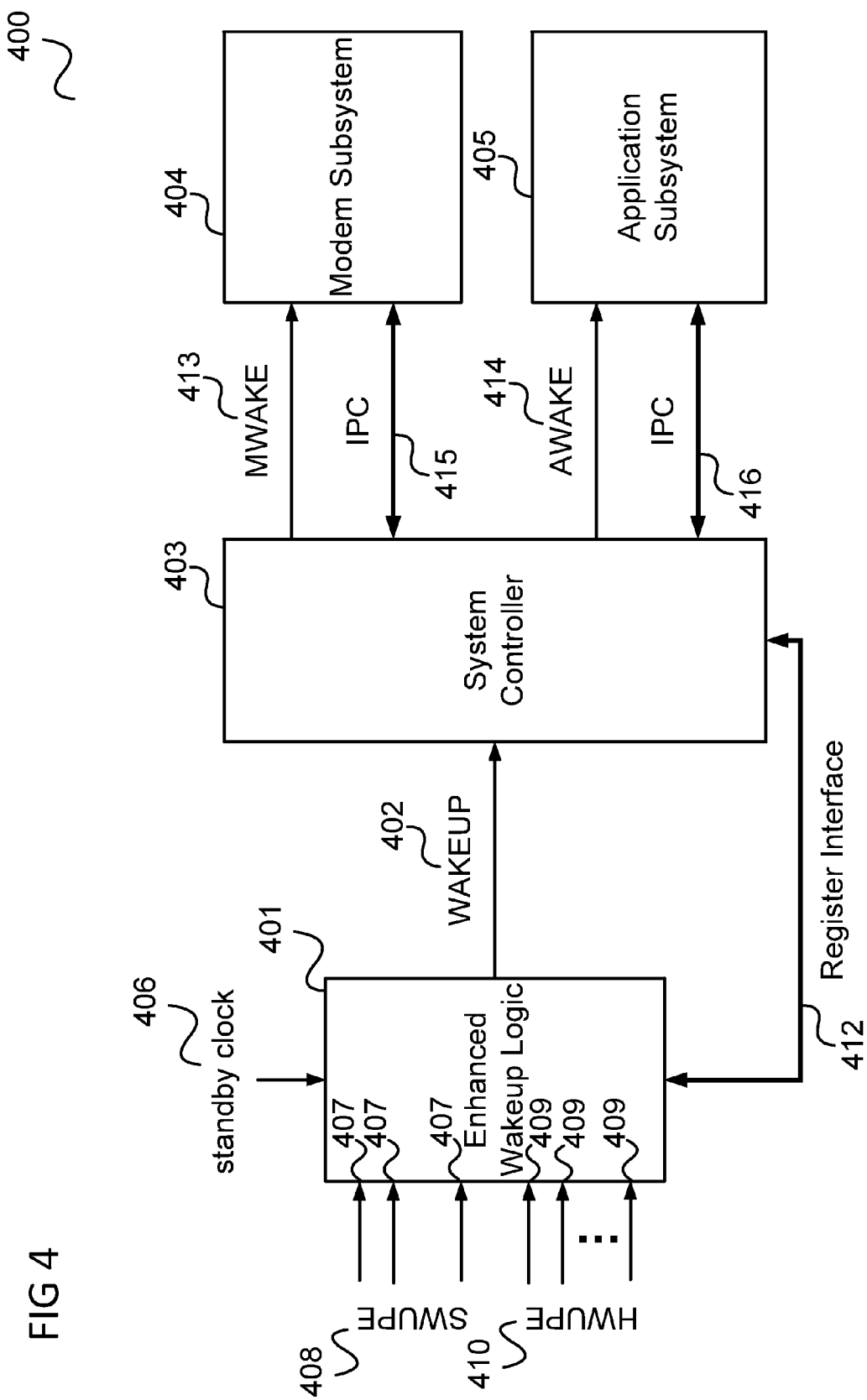
FIG. 4 shows a circuit arrangement arranged in a communication device.

FIG. 4 shows a circuit arrangement 400 arranged in a communication device.

The circuit arrangement 400 is part of a data processing system, in this example a communication device such as the communication device 100.

The circuit arrangement 400 includes a wake-up logic 401, a system controller 403, a modem subsystem 404 and an application subsystem 405. For example, the wake-up logic 401 and the system controller 403 are part of the processing components 112, the modem subsystem 404 corresponds to the transceivers 114, 118 and the application subsystem corresponds to the CPU 102 (and possibly further components such as one or more of ROM 104, RAM 106, display 108 and keyboard 110).

In this example, the wake-up logic 401 corresponds to the controller 203 and the system controller 403 corresponds to the circuit 202.

The system controller 403, the modem subsystem 404 and the application subsystem 405 are in this example part of a power domain of, e.g., the communication device 100. This means that these components can enter a low power mode (e.g. can get to sleep or be inactive), for example if the communication device 100 enters a low power mode.

In contrast, the wake-up logic 401 is in this example part of a standby domain of, e.g., the communication device 100. This means that the wake-up logic stays awake (e.g. active) even if the communication device 100 enters low power mode.

The wake-up logic 401 receives a clock signal 406 (e.g. from a clock generator of the communication device 100). The clock signal 406 is for example a standby clock signal 406, i.e. a clock signal of the communication device 100 when it is in low power mode (e.g. standby mode or sleep mode). The wake-up logic 401 includes a plurality of first inputs 407 to receive soft wake-up requests 408 (denoted as SWUPE for "soft wake-up event") and a plurality of second inputs 409 to receive hard wake-up requests 410 (denoted as HWUPE for "hard wake-up event"). The soft wake-up requests 408 are delayable while the hard wake-up requests 410 are not delayable.

The wake-up logic 401 can issue a wake-up signal 402 to the system controller 403 to trigger a wake-up (or generally a return from low power mode) of the system controller 403. Further, the wake-up logic 401 has a register interface 412 to the system controller 403.

The system controller 403 may issue a modem wake-up signal 413 to the modem subsystem 404 and an application subsystem wake-up signal 414 to the application subsystem 405. The system controller 403 is further coupled to the modem subsystem 404 by means of a modem interface 415 (e.g. for inter-processor communication (IPC)), and is further coupled to the application subsystem 405 by means of a application subsystem interface 416 (e.g. for inter-processor communication (IPC)). It should be noted that the modem wake-up signal 413 and the application subsystem wake-up signal 414 may alternatively be directly be generated by the enhanced wakeup logic 401, which may also be implemented as a hardware part of the system controller 403.

The wake-up logic 401 is described in the following in more detail with reference to FIG. 5.

Figure 5:
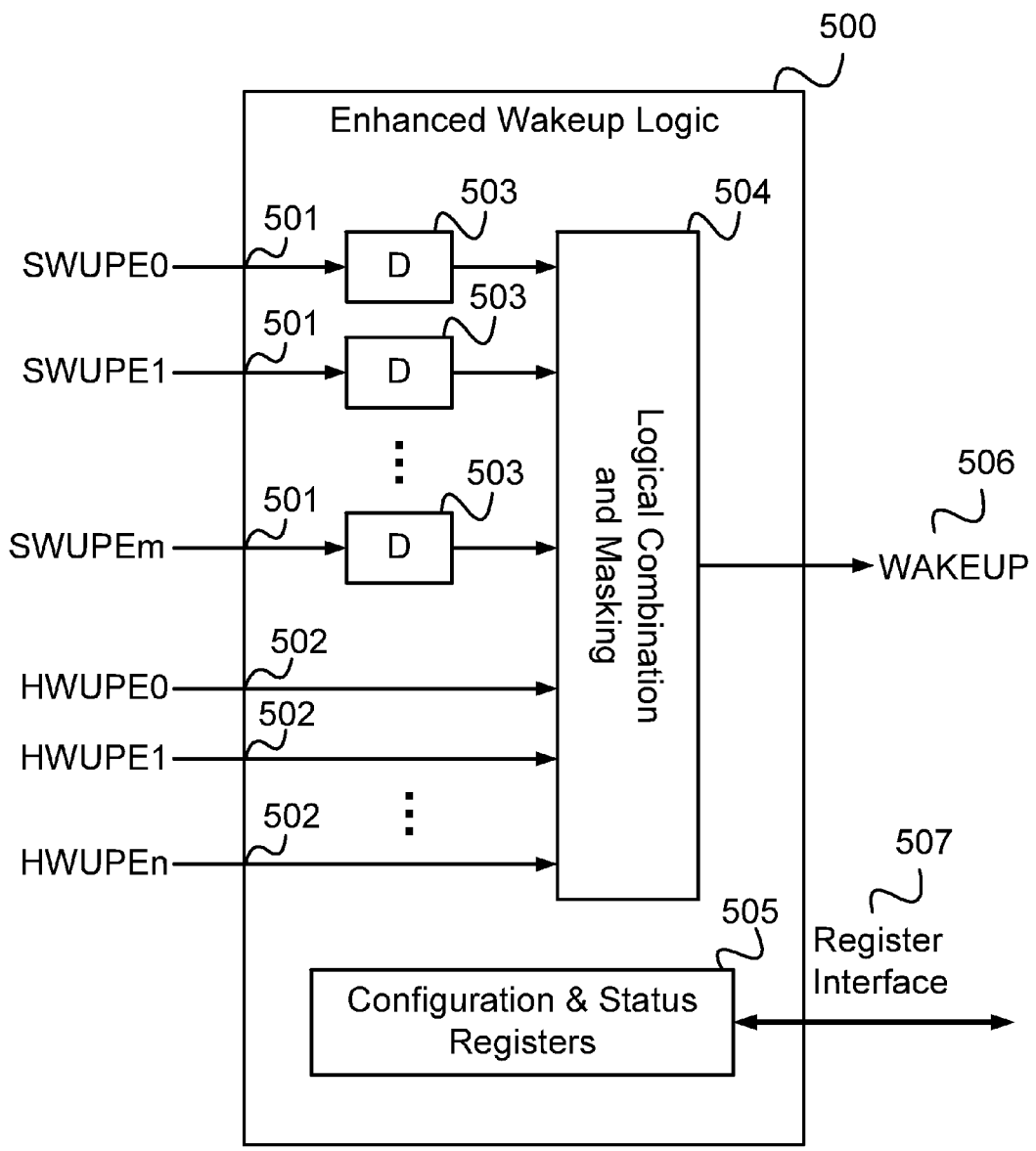
FIG. 5 shows a wake-up logic.

FIG. 5 shows a wake-up logic 500.

Corresponding to the wake-up logic 401, the wake-up logic 500 has a plurality of first inputs 501 for receiving soft wake-up requests corresponding to soft wake-up events (SWUPEs) and a plurality of second inputs 502 for receiving hard wake-up requests corresponding to hard wake-up events (HSWUPEs).

A distinction between soft wake-up events and hard wake-up events is for example made according to following:

A SWUPE can tolerate a certain delay for actual wake-up of one or more subsystems 404, 405 (or the complete system);

A HWUPE always requires an immediate wake-up of one or more subsystems 404, 405 (or the complete system), i.e. no delay (e.g. in terms of clock cycles) may be introduced.

The enhanced wake-up logic 500 supports both wake-up requests corresponding to SWUPEs (via the first inputs 501) as well as wake-up requests corresponding to HWUPEs (via the second inputs 502). The enhanced wake-up logic 500 includes, for each first input 501, a configurable delay logic 503 (such as a shift register with a configurable number of stages), so that a maximum wake-up delay value (e.g. in terms of clock cycles) can be configured for each soft wake-up request. A soft wake-up request is treated with its defined maximum delay value, i.e. the maximum delay value defined for the soft wake-up request is, in worst case, the time between the reception of the soft wake-up request by the wake-up logic 500 and the actual wake-up of the system controller 403. A hard wake-up request always results in an immediate wake-up of the system controller 403 by means of a wake-up signal 506 (corresponding to wake-up signal 402).

The wake-up logic 500 includes a combination and masking unit (e.g. circuit) 504 which generates the wake-up signal 506 by combining the soft wake-up requests and the delayed soft wake-up requests, i.e. issues the wake-up signal 506 if it receives a hard wake-up request (via the second inputs 502) or a delayed soft wake-up request from the delay elements 503, i.e. a soft wake-up request whose maximum delay value has been reached.

In other words, the wake-up logic 500 (also referred to as EWL for Enhanced Wake-Up Logic) provides delay functions for less latency critical wake-up events (namely the SWUPEs). The wake-up logic 500 is for example the central wake-up logic in the system (e.g. the communication device 100), handling all sorts of input wake-up events.

An actual system wake-up (including at least a wake-up of the system controller 403) is triggered by the wakeup logic and thus only occurs if a hard wake-up request has been received by the wake-up logic or if the maximum tolerable delay of a received soft wake-up request has been reached.

Consequently, several soft wake-up requests may already be in pending state (i.e. may currently be delayed by the delay elements 503) when a system wake-up is triggered. In this way, SWUPEs can be synchronized with HWUPEs, at least within certain limits.

With the wakeup logic 500, the system's current consumption may be reduced. With increasing leakage of smaller integrated circuit technologies it becomes even more important to keep the amount of hardware circuitry being involved in the initial wake-up handling stage low. Furthermore, by synchronizing (combining) wake-up events, the overall number of wake-up occurrences may be reduced.

The wake-up logic 500 may be implemented in hardware in order to avoid involvement of software running on a CPU (e.g. the CPU 102) for tasks related to delaying and synchronization of wake-up requests. As a consequence the (hardware) wake-up signal 506 may be purely controlled by a hardware function which may be implemented with a rather small hardware circuit and thus allow power efficient managing of wake-up requests.

The delay logic elements 503 can be realized by counters being clocked with a (low-power) standby clock of the system, e.g. a clock of the communication device 100. This allows configuration of individual maximum delay values for SWUPEs on a granularity of standby clock cycles.

The wake-up requests can be configured to be masked (i.e. disabled). The combination and masking unit 504 ignores the masked wake-up requests, i.e. does not issue the wake-up signal 506 due to receipt of a masked wake-up request. The combination and masking unit 504 logically combines the hard wake-up requests and the delayed soft wake-up requests (output by the delay elements 503) so that the wake-up signal 506 is issued (e.g. is set to an active level) if at least one unmasked wake-up request is supplied to the combination and masking unit 504. This wake-up signal 506 controls the actual wake-up of the system controller 503 which performs the further wake-up processing. The system controller 503 may involve software. For example, it may be implemented by software running on the CPU 102 such that wake-up of the system controller 503 is a wake-up of the CPU 102.

The wake-up logic 500 includes configuration & status registers 505 which are coupled to the system controller 403 via a register interface 507 (corresponding to register interface 412). Via the register interface 507, the system controller 403 may apply configuration settings storing them in the registers 505 and retrieve of status information stored in the registers 505. The register interface 507 may for example be used by a system control software running on a system controller CPU, i.e. a CPU implementing the system controller 403, which may be the main CPU 102 or also a co-processor of the communication device 100.

In the example, an example for a processing flow for the handling of wake-up requests is described with reference to FIG. 6.

Figure 6:
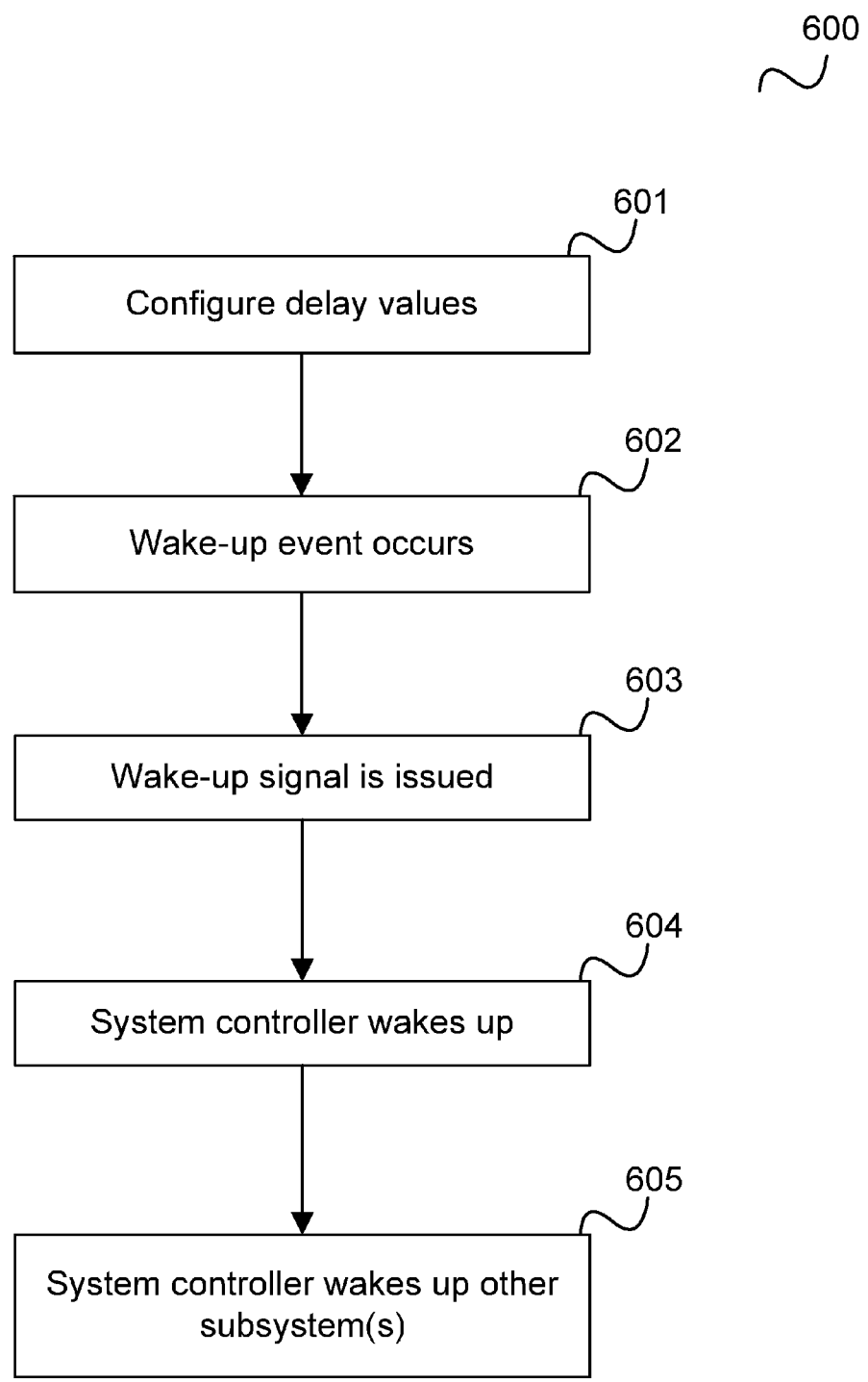
FIG. 6 shows a flow diagram.

FIG. 6 shows a flow diagram 600.

In 601, e.g. during system start-up, there may be a configuration phase for configuring the handling of wake-up requests. In this phase, the system controller 403 may configure the maximum delay values for all utilized SWUPEs through the register interface 507 by storing corresponding configuration parameters in the registers 505. The applicable maximum delay value for a SWUPE may depend on the function associated with the wake-up event, e.g. a key press or a touch screen action of user may tolerate a delayed system wake-up in the order of 100 ms without negative impact on user experience.

It is assumed that a wake-up event occurs in 602.

If the wake-up event is a SWUPE and accordingly a soft wake-up request is received by the wake-up logic 500 (e.g. the corresponding request line is set to an active level), the start of the delay logic 503 assigned for that particular wake-up request (i.e. connected to the first input 501 via which the request is received) is triggered and the request is considered as pending. Thus, the wake-up signal 506 towards the system controller 403 is not issued immediately at occurrence of a SWUPE, but it will be issued when the delay logic counter has reached its pre-configured value. In contrast to that, if the wake-up event is a HWUPE and accordingly a hard wake-up request is received by the wake-up logic 500 the wake-up logic immediately triggers a wake-up of the system controller.

As a result, in 603, the wake-up signal 506 towards the system controller is output by the wake-up logic, either if a HWUPE has occurred or the maximum delay time of a pending SWUPE has been reached.

In 604, the system controller 403 awakes in response to the wake-up signal 506. For example, in a first stage, hardware functions are used for terminating the system controller's (deep) sleep state. In a later stage, for example system control software running on system controller CPU continues to control the further wake-up tasks. Through the register interface 412, the system controller 403 retrieves information about active or pending wake-up events from the wake-up logic 401. In this context, a wake-up event is active if a wake-up request corresponding to the wake-up event has been received by the wake-up logic 403 (in other words when a wake-up request corresponding to the wake-up event has been issued) and the wake-up event is not pending (i.e. the wake-up request corresponding to the wake-up event is not currently being delayed). Thus, each wake-up event for which a wake-up request has been received by the wake-up logic is either pending, active because its maximum delay has been reached or active because it is a HWUPE.

There may in general be multiple active or pending wake-up events. The system controller 403 may check all of them in order to know whether and which other subsystems 404, 405 of the system need to be woken up.

The system controller 403 has for example a priori knowledge for each wake-up event whether other subsystems 404, 405 must be woken up for handling the function associated with the wake-up event. There may also be wake-up events which can be completely covered by the system controller 403 itself and for which consequently no other subsystems 404, 405 need to be woken up.

In 605, in case the system controller 403 has determined that one or more other subsystems 404, 405 need to be woken up for handling any one of the active or pending wake-up events, a needed subsystem 404, 405 is woken up by the system controller 403, e.g. by means of the modem wake-up signal 413 or the application wake-up signal 414, respectively. A first stage of this is for example implemented by hardware functions for terminating the affected subsystem's 404, 405 (deep) sleep state. Then the subsystem 404, 405 is informed about their related wake-up reason, e.g. by hardware signaling or software inter-processor communication (IPC) via the modem interface 415 or the application subsystem interface 416, respectively. The subsystem which has been woken up then performs its (local) tasks as required for handling of the wake-up event(s) due to which it has been woken up, i.e. its (local) wake-up reason or reasons.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A circuit arrangement comprising:
a clock generator configured to generate a clock signal;
a circuit having a low power mode; and
a controller, configured to
  receive, when the circuit is in the low power mode, a request specifying that the circuit should return from the low power mode;
  check whether the request is delayable upon reception of the request; and
  trigger the circuit to return from the low power mode when the number of clock cycles of the clock signal since the reception of the request has reached a threshold value if it has been detected that the request is delayable.

2. The circuit arrangement according to claim 1, wherein the controller is configured to trigger the circuit to return from the low power mode when the number of clock cycles of the clock signal since the reception of the request has reached the threshold value or when the controller receives a further request specifying that the circuit should return from the low power mode that is undelayable.

3. The circuit arrangement according to claim 2, wherein the controller is configured to check, upon reception of the further request, whether the further request is undelayable.

4. The circuit arrangement according to claim 1, wherein the circuit has a high power mode and a low power mode and the request specifies that the circuit should switch to the high power mode.

5. The circuit arrangement according to claim 1, wherein the low power mode is a sleep mode and the request is a wake-up request.

6. The circuit arrangement according to claim 1, wherein the circuit is a processor.

7. The circuit arrangement according to claim 1, further comprising, in addition to the circuit, a hardware component implementing the controller.

8. The circuit arrangement according to claim 1, wherein the controller is configured to be in a high power mode when the circuit is in the low power mode.

9. The circuit arrangement according to claim 1, wherein the low power mode is a sleep mode and the controller is configured to be awake when the circuit is in sleep mode.

10. The circuit arrangement according to claim 1, comprising a plurality of further circuits having a low power mode, wherein the circuit is a circuit configured to determine which further circuits of the plurality of further circuits should be triggered to return from the low power mode in response to the request.

11. The circuit arrangement according to claim 10, wherein the request is associated with a function to be provided by the circuit arrangement and the circuit is configured to determine which further circuits of the plurality of further circuits should be triggered to return from the low power mode in response to the request.

12. The circuit arrangement according to claim 1, being a communication device.

13. The circuit arrangement according to claim 1, being a mobile terminal.

14. The circuit arrangement according to claim 1, wherein the threshold value depends on a type of the request.

15. The circuit arrangement according to claim 1, wherein the controller is further configured to determine the threshold value for the request based on information about the request.

16. The circuit arrangement according to claim 1, wherein the request is associated with a function to be provided by the circuit arrangement and wherein the threshold value depends on the function.

17. The circuit arrangement according to claim 16, wherein the request is associated with a function to be provided by the circuit arrangement and wherein the controller is configured to determine the threshold value for the request depending on the function.

18. The circuit arrangement according to claim 1, wherein the controller comprises a delay element configured to delay the request by a number of clock cycles depending on the threshold value.

19. The circuit arrangement according to claim 1, wherein the controller comprises a delay element configured to delay the request by a number of clock cycles equal to the threshold value.

20. The circuit arrangement according to claim 1, wherein the controller is further configured to start a timer in response to the reception of the request, wherein the timer is clocked by the clock signal, and to trigger the circuit to return from the low power mode when the timer has reached the threshold value.

21. The circuit arrangement according to claim 1, wherein the controller further comprises a signaling circuit and is configured to trigger the circuit to return from the low power mode by controlling the signaling circuit to supply a wake-up signal to the circuit.

22. A method for low power mode management comprising generating a clock signal;

receiving, when a circuit is in the low power mode, a request specifying that the circuit should return from the low power mode;

checking whether the request is delayable upon reception of the request; and triggering the circuit to return from the low power mode when the number of clock cycles of the clock signal since the reception of the request has reached a threshold value if it has been detected that the request is delayable.

\* \* \* \* \*